June 10 1930.  T. W. ROSS  1,763,258
ELECTRIC RELAY
Filed Sept. 22, 1923
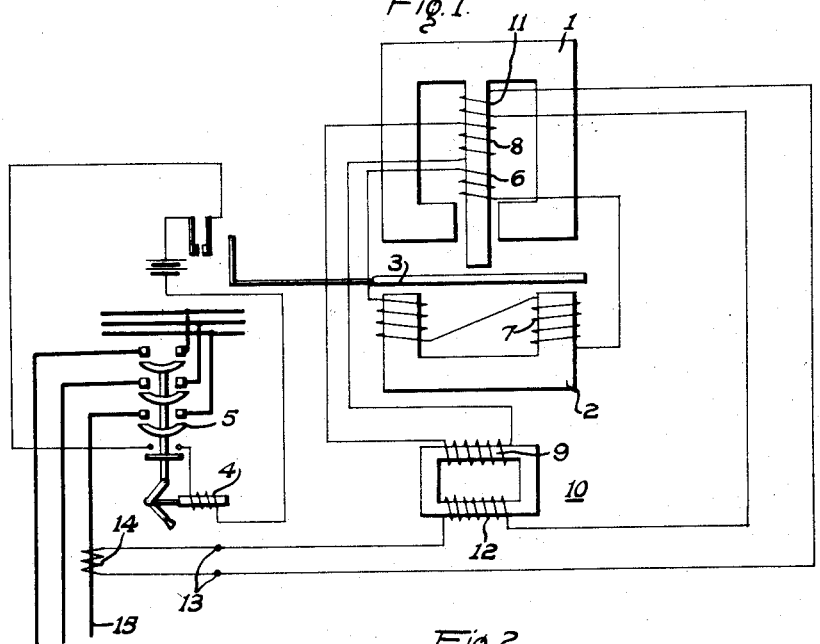
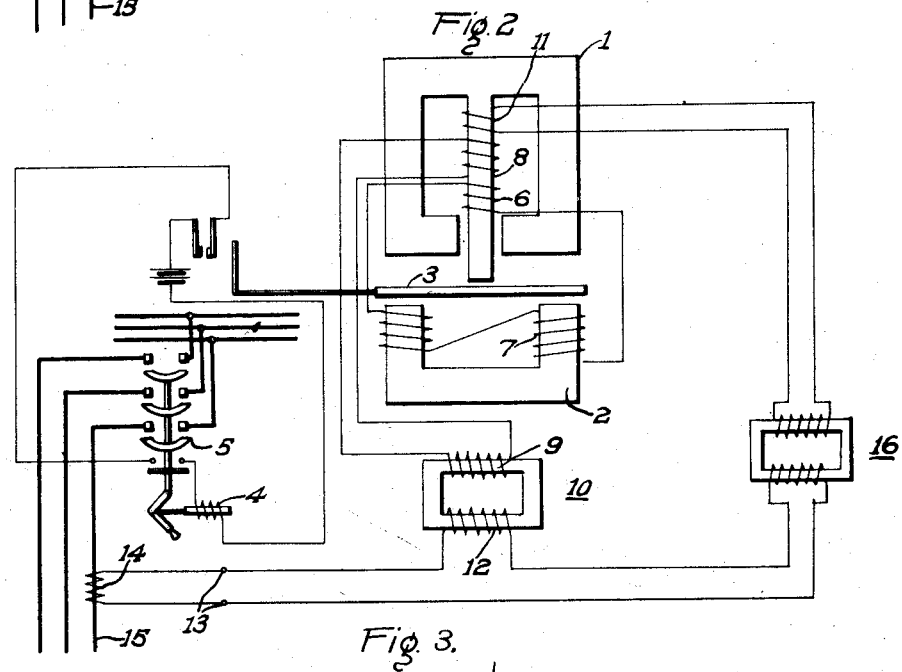
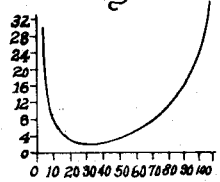
WITNESSES:
INVENTOR
Thomas Wylie Ross.
BY
ATTORNEY Patented June 10, 1930

1,763,258

UNITED STATES PATENT OFFICE

THOMAS WYLIE ROSS, OF MANCHESTER, ENGLAND, ASSIGNOR TO WESTINGHOUSE ELECTRIC & MANUFACTURING COMPANY, A CORPORATION OF PENNSYLVANIA

ELECTRIC RELAY

Application filed September 22, 1923, Serial No. 664,192, and in Great Britain October 21, 1922.

This invention relates to electric relays for controlling the operation of automatic circuit breakers and in particular to relays of the kind provided with a lock-out or retaining coil which prevents the operation of the relay when a current exceeding a predetermined limit is passing through the circuit which is to be protected.

The relay of the present invention is an induction relay of a known construction having an inverse definite minimum time limit, that is to say, the interval of time which elapses before the relay operates to cause the circuit breaker to open varies inversely as the strength of the current traversing the circuit to be protected, but is never less than a certain definite minimum period. This action is obtained by energizing the relay coil through a transformer which becomes saturated at, for example, about three times the normal full load.

Where it is desired to supply a comparatively small load from an electrical distributing system which has a large capacity there is a possibility, in the event of a short-circuit, of an exceedingly large current resulting and, if the circuit breaker provided in the circuit of the said load is designed to handle the maximum current which may be assumed by the load, there is a likelihood when the circuit breaker opens of its being injured or destroyed.

According to the present invention, the relay is adapted to prevent the opening of the circuit breaker when the current traversing the circuit to be protected exceeds the maximum current which the circuit breaker is designed to rupture. For this purpose a coil is provided in the magnetic system of the relay and is arranged to oppose the main operating winding thereof. This coil is included in series with the primary winding of the saturable transformer supplying the main operating winding of the relay and is so proportioned that with a very heavy current traversing the primary circuit of, for example, twenty times the ordinary full load current, the total operating flux in the magnetic system of the relay is reduced to such a value that the resulting torque will be insufficient to cause the operation of the relay.

In order that the invention may be more fully understood, reference will be made to the accompanying drawings in which Figure 1 is a diagrammatic view of an electrical system embodying a relay constructed in accordance with the invention;

Fig. 2 is a similar view illustrating a modification of the relay shown in Fig. 1; and Fig. 3 is a graph illustrating the relation between the current traversing the relay and the time required in its operation.

In the drawings, the relay comprises a magnetizable core member 1 which cooperates with a second magnetizable core member 2 to actuate a disc 3 that is adapted to open or close the circuit of the trip coil 4 of a circuit interrupter 5. The relay further comprises shaded poles having a coil 6 connected in series with energizing coils 7 for the magnetizable core 2. The main operating coil 8 of the relay is connected in series with the secondary winding 9 of a saturable transformer 10 and an opposing winding 11 is connected in series with the primary winding 12 of the transformer 10 across the terminals 13 of the relay. The relay terminals 13 are connected to the secondary winding of a current transformer 14 provided in the circuit 15 which it is desired to protect.

The operation of the relay is as follows: Should an overload occur which is within the capacity of the circuit-interrupter, the flux produced by the main operating winding 8 will predominate over the opposing flux produced by the coil 11 thereby actuating the disc 3 to open the circuit breaker.

Should, however, a short-circuit or any other condition occur in the circuit to be protected which would cause an excessive current to traverse the circuit, which would be beyond the capacity of the circuit-interrupter, a correspondingly large current would traverse the opposing winding 11. The current flowing in the winding 8, however, would not be substantially increased by reason of the transformer 10 becoming saturated, and for any predetermined overload, say twenty times the ordinary full load current, the resultant flux due to the currents in the opposing windings 8 and 11 would be reduced to such value that the operating torque would be insufficient to actuate the disc 3.

In the event of very excessive overloads, there is a danger of the flux developed by the winding 11 being increased to such extent as to cause the relay to operate. Usually this will be prevented by reason of the current transformer 14 in the circuit 15 becoming so saturated that the current traversing the primary winding 12 and coil 11 is limited to a value below that which would cause the operation of the relay. Where, however, this is not the case, the arrangement shown in Fig. 2 may be employed in which the opposing winding 11 is supplied from the primary winding 12 through a saturable transformer 16. In the event of very excessive overloads occurring, the current in the winding 11 is prevented from increasing substantially above a predetermined limit which is fixed by design of the transformer 16. In this way it is impossible for the flux developed by the winding 11 so to predominate over the opposing flux developed to the winding 8 as to cause the relay to operate.

Devices may be provided in the main distributing circuit to rupture any excessive currents beyond the capacity of the circuit-interrupter described and a plurality of relays constructed as above and variously proportioned may be provided to cooperate with a corresponding number of circuit-interrupters of varying capacity as will be readily understood.

As illustrated in Fig. 3, the time of operation decreases as the current increases up to a predetermined value and beyond that value the time of operation in the relay increases, to permit a larger interrupter in the system to rupture the circuit rather than the small interrupter associated with the relay described.

The relay may be controlled to operate in accordance with different time curves by adjusting the magnetic character of the saturating transformers.

Various modification may be made in the construction and circuit arrangements of the relay without departing from the scope of the invention as set forth in the appended claims.

I claim as my invention:

1. In an electric relay, the combination with a movable member and an energizing coil to actuate the movable member, of an opposing winding and means for modifying the energization of both windings to permit the relay to operate in response to currents less than a predetermined value but to preclude its operation in response to currents exceeding such value.

2. In an electric relay, the combination with a movable member and an operating winding to actuate the movable member, of a differentially opposing winding to render the operating winding ineffective under excessive current conditions.

3. In a relay of the induction type, the combination with magnetic means providing paths for cooperating magnetic fluxes and a disk member responsive thereto, of a main winding and an opposing winding for energizing the magnetic means, and means for modifying the energization of said windings so that said disc will be actuated in response to certain values of current but will be prevented from actuation in response to other values of current.

4. In an induction relay for protecting an alternating-current circuit, the combination with a disc and means adapted to be energized from the circuit to establish a force to move the disc, of means responsive to the degree of energization of such means for differentially modifying the action thereof in moving the disc, so that movement of the disc will be permitted up to a certain degree of energization but precluded beyond such a degree.

5. In an induction-type relay for protecting an electric circuit, the combination with a disc and operating windings adapted to be energized from the circuit for effecting the movement of the disc, of means for precluding movement of the disc when an excessive current traverses the circuit, said means including a winding for differentially modifying the action of at least one of the windings.

6. A relay for protecting an alternating current circuit comprising a movable armature, an operating winding associated therewith, a second winding differentially related to said operating winding, means whereby the flux induced by said operating winding predominates over that induced in said second winding to actuate said armature upon the occurrence of a normal overload in said circuit, and means whereby the flux induced by said second winding predominates to prevent movement of said armature upon the occurrence of an excessive overload.

In testimony whereof, I have hereunto subscribed my name this fifth day of September, 1923.

THOMAS WYLIE ROSS.